United States Patent
Maeda et al.

(10) Patent No.: US 11,110,874 B2
(45) Date of Patent: Sep. 7, 2021

(54) METHOD FOR JOINING MEMBERS AND JOINED BODY

(71) Applicant: KOBE STEEL, LTD., Hyogo (JP)

(72) Inventors: Yasuhiro Maeda, Kobe (JP); Toru Hashimura, Kobe (JP); Kenichi Watanabe, Kobe (JP); Ryohei Yukishige, Kobe (JP); Taiki Yamakawa, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 270 days.

(21) Appl. No.: 16/488,555

(22) PCT Filed: Mar. 13, 2018

(86) PCT No.: PCT/JP2018/009693
§ 371 (c)(1),
(2) Date: Aug. 23, 2019

(87) PCT Pub. No.: WO2018/168841
PCT Pub. Date: Sep. 20, 2018

(65) Prior Publication Data
US 2019/0375355 A1 Dec. 12, 2019

(30) Foreign Application Priority Data

Mar. 17, 2017 (JP) .............................. JP2017-053645
Jul. 31, 2017 (JP) .............................. JP2017-148104

(51) Int. Cl.
*B60R 19/03* (2006.01)
*B21D 53/88* (2006.01)
(Continued)

(52) U.S. Cl.
CPC ............ *B60R 19/03* (2013.01); *B21D 39/044* (2013.01); *B21D 39/046* (2013.01); *B21D 39/06* (2013.01);
(Continued)

(58) Field of Classification Search
CPC .... B21D 39/038; B21D 39/04; B21D 39/044; B21D 39/046; B21D 39/06; B21D 39/20;
(Continued)

(56) References Cited

U.S. PATENT DOCUMENTS

| 2018/0015527 A1 | 1/2018 | Maeda et al. |
| 2019/0210088 A1 | 7/2019 | Maeda et al. |
| 2019/0210089 A1 | 7/2019 | Maeda et al. |

FOREIGN PATENT DOCUMENTS

| EP | 3 254 781 A1 | 12/2017 | |
| GB | 2024681 A | * 1/1980 | ........... B21D 39/206 |
| JP | 2016-147309 A | 8/2016 | |

* cited by examiner

*Primary Examiner* — Jermie E Cozart
(74) *Attorney, Agent, or Firm* — Studebaker & Brackett PC

(57) ABSTRACT

A method for joining members according to an embodiment of the present invention includes: providing a bumper stay including two integrated pipe portions extending in an identical direction, the bumper stay including a recess provided between the pipe portions being adjacent to each other, the recess extending in a longitudinal direction of the pipe portions from end surfaces of the pipe portions, a part of the recess serving as a locking portion, and a bumper beam including a rear inclined wall formed with two hole portions into which the pipe portions of the bumper stay are insertable respectively; inserting the bumper stay into the hole portions of the bumper beam until the locking portion abuts on the rear inclined wall; and pipe-expanding an insertion portion of the bumper stay into the bumper beam to join the insertion portion to the bumper beam by press-fitting.

16 Claims, 13 Drawing Sheets

(51) Int. Cl.
  *B21D 39/20*    (2006.01)
  *B21D 39/06*    (2006.01)
  *B21D 39/04*    (2006.01)
  *B60R 19/18*    (2006.01)
  *B21D 39/03*    (2006.01)
  *B60R 19/24*    (2006.01)
  *B60R 19/04*    (2006.01)
  *B60R 19/30*    (2006.01)

(52) U.S. Cl.
  CPC ........... *B21D 39/20* (2013.01); *B21D 39/206* (2013.01); *B21D 53/88* (2013.01); *B21D 39/038* (2013.01); *B21D 39/04* (2013.01); *B21D 39/203* (2013.01); *B60R 19/04* (2013.01); *B60R 19/24* (2013.01); *B60R 19/30* (2013.01); *B60R 2019/1806* (2013.01); *B60R 2019/1813* (2013.01); *B60R 2019/242* (2013.01); *Y10T 29/4994* (2015.01); *Y10T 29/49911* (2015.01)

(58) Field of Classification Search
  CPC .. B21D 39/0203; B21D 39/206; B21D 53/88; B60R 19/03; B60R 19/04; B60R 19/30; B60R 2019/1806; B60R 19/24; B60R 2019/1813; B60R 2019/242; Y10T 29/4994; Y10T 29/49911; Y10T 29/4966
  See application file for complete search history.

મેthod FOR JOINING MEMBERS AND JOINED BODY

CROSS-REFERENCE TO RELATED APPLICATIONS

This is a national phase application in the United States of International Patent Application No. PCT/JP2018/009693 with an international filing date of Mar. 13, 2018, which claims priority of Japanese Patent Application No. 2017-053645 filed on Mar. 17, 2017 and Japanese Patent Application No. 2017-148104 filed on Jul. 31, 2017, the contents of which are incorporated herein by reference.

TECHNICAL FIELD

The present disclosure relates to a method for joining members and a joined body.

BACKGROUND ART

Low specific gravity and high strength metal referred to as high tension steel is used to reduce weight and improve safety of vehicles. Although the high tension steel is effective in reducing weight and improving safety, the high tension steel is heavier than lower specific gravity material such as an aluminum alloy. In addition, when high tension steel is used, the high strength of the high tension steel causes problems such as a decrease in formability, an increase in forming load, and a decrease in dimensional accuracy. In order to solve these problems, in recent years, extruded materials, cast products, and press-formed products of aluminum alloys having specific gravity lower than that of steel are used for vehicle parts. Since the aluminum alloy has low specific gravity, the aluminum alloy is effective for weight reduction, but has low strength. Therefore, multi-materialization of combining and utilizing steel parts such as high tension steel and aluminum alloy parts has been performed.

The problem with multi-materialization is the joining of dissimilar metals such as steel parts and aluminum alloy parts. For example, JP 2016-147309 A discloses a method for joining members of enabling dissimilar metals to be joined in multi-materialization with utilizing an elastic body. Specifically, in a method for joining members of JP 2016-147309 A, an aluminum pipe is inserted into a hole of a steel part, rubber (an elastic body) is inserted inside the aluminum pipe, and the rubber is compressed to be deformed, whereby the aluminum pipe is enlarged and deformed, and the steel part and the aluminum pipe are joined by press-fitting.

SUMMARY OF THE INVENTION

Problems to be Solved by the Invention

However, in the method for joining members in JP 2016-147309 A, when force is applied in a central axis direction of the aluminum pipe, the joining between the steel part and the aluminum pipe may be broken, and the aluminum pipe may break through the steel part. For example, in a case where the invention in JP 2016-147309 A is applied to a bumper of a vehicle, when a strong collision force is applied from the front of the vehicle, this breaking through the steel part may significantly occur.

Embodiments of the present invention is made under these circumstances, and an object thereof is, in a method for joining members of joining a first member and a second member, or a joined body thereof, to prevent the first member from breaking through the second member when a load is applied in a longitudinal direction of the first member.

Means for Solving the Problems

A method for joining members according to an embodiment of the present invention includes: providing a first member including at least two pipe portions extending in an identical direction and integrated, the first member including a recess provided between two adjacent pipe portions of the at least two pipe portions, the recess extending in a longitudinal direction of the at least two pipe portions from end surfaces of the at least two pipe portions, a part of the recess serving as a locking portion, and a second member including a locking wall formed with at least two hole portions into which the at least two pipe portions of the first member are insertable respectively; inserting the at least two pipe portions of the first member into the at least two hole portions of the second member until the locking portion abuts on the locking wall; and pipe-expanding an insertion portion of the at least two pipe portions of the first member inserted into the second member to join the insertion portion to the second member by press-fitting.

According to this method, a recess is provided at the end portion of the pipe portion in the first member, and a part of the recess is a locking portion. That is, the locking portion is not flush with the end surface of the pipe portion of the first member, but is provided at a position one step descending from the end surface. Therefore, when the pipe portion of the first member is inserted into the hole portion of the second member, the locking portion is not inserted together with the end surface, and can abut on the locking wall of the second member outside the second member. Therefore, when force is applied in the longitudinal direction of the first member, the force can be received not only at the joint portion but also at the abutting portion. As described above, since the force can also be dispersed to parts other than the joint portion, it is possible to prevent the joining from being broken and to prevent the first member from breaking through the second member. In addition, even when force is applied in a direction other than the longitudinal direction of the first member, the first member is supported by the second member at the abutting portion so that it is possible to prevent the first member from falling due to the joining being broken. Therefore, the load capacity in a direction other than the longitudinal direction of the first member can also be improved.

In the method for joining members, the first member may penetrate the second member.

According to this method, when the hole portion is formed in the second member, a through hole can be formed. The through hole is easy to form from the viewpoint of machining as compared with a half stop (half through) hole. In addition, since the first member penetrates the second member, the pipe expansion machining can be performed from both sides of the end portions of the pipe of the first member.

The method for joining members may further include: providing an elastic body insertable into the at least two pipe portions of the first member; inserting the elastic body into the at least two pipe portions of the first member; and compressing the elastic body in a longitudinal direction of the at least two pipe portions of the first member to expand the elastic body radially outward of the at least two pipe portions, thereby pipe-expanding the first member. The term radially outward here means a direction perpendicular to the longitudinal direction of the pipe portion, that is, the shape of the pipe portion is not limited to that of a circular pipe.

According to this method, the pipe portion of the first member can be uniformly expanded due to the isotropic deformability of the elastic body. Therefore, local load can be reduced and local deformation can be prevented. Therefore, the first member and the second member can be fitted with high accuracy, that is, the joining strength can be improved, as compared with other joining methods.

In the method for joining members, the second member may be pipe-shaped and may have a partition wall partitioning an inside of the second member, and the at least two pipe portions of the first member may be inserted into the at least two hole portions of the second member so that the partition wall is disposed in the recess.

According to this method, the rigidity of the second member can be improved by the partition wall. In addition, when the pipe portion of the first member is expanded inside the second member, the pipe portion may also abut on the partition wall. Therefore, since the area of the joint portion is increased, the joining strength can be improved, and since the first member can be supported by the partition wall, the fall of the first member can also be further prevented as described above. In addition, if machining for providing a hole portion to the partition wall is needed, such complicated machining is generally difficult. However, in the above method, since the pipe portion of the first member is inserted into the hole portion of the second member so that the partition wall is disposed in the recess, that is, the partition wall engages in the recess, the pipe portion of the first member can be inserted into the hole portion of the second member while avoiding the partition wall. Therefore, the partition wall does not need to be subjected to complicated machining for providing the hole portions, and the above method is effective from the viewpoint of machining property.

In the method for joining members, the recess may be formed by: end portions of the two adjacent pipe portions of the first member; and two connection walls connecting the two adjacent pipe portions of the first member, the two connection walls orthogonal to the locking wall, and the locking portion may be a part of the connection wall.

According to this method, since the locking portion being a part of the two connection walls abuts on the locking wall in the joined state, the first member is supported by the second member at two places other than the joint portion. Therefore, it is possible to effectively prevent the breaking through the second member and falling of the first member described above, as compared with the case of supporting at one place other than the joint portion.

In the method for joining members, the recess may be formed by: end portions of the two adjacent pipe portions of the first member; and one connection wall connecting the two adjacent pipe portions of the first member, the one connection wall orthogonal to the locking wall, and the locking portion may be a part of the connection wall.

According to this method, since only one connection wall is provided, the connection wall can be easily formed, and the breaking through the second member and falling of the first member can be easily prevented.

In the method for joining members, the recess may be formed by a cutout portion obtained by cutting out an end portion of one of the at least two pipe portions of the first member, and the locking portion may be a part of the cutout portion.

According to this method, when the recess and the locking portion are formed, forming the cutout portion by cutting work or the like allows the recess and the locking portion to be easily formed without the need to provide the connection wall as described above. In addition, the recess and the locking portion can be formed later by using, for example, an existing double pipe as the first member.

In the method for joining members, the first member may be a bumper stay of a vehicle, and the second member may be a bumper beam of a vehicle.

According to this method, when collision force from the front is applied to the vehicle, since the bumper stay can be prevented from breaking through the bumper beam as described above, the bumper stay is crushed in the event of a collision. When the bumper stay is crushed, the energy of the collision is absorbed, so that the collision force can be dispersed before reaching the cabin, and the driver can be protected safely. In addition, when the collision force is applied from the side of the vehicle, the bumper stay can be prevented from falling down (falling sideways) as described above, so that the bumper stay can be prevented from coming out of the bumper beam. Therefore, the reliability of the bumper can be improved.

In the method for joining members, the hole portion of the second member may be burring-machined.

According to this method, since the joining area between the first member and the second member can be increased by burring, the joining strength can be improved.

A joined body according to the embodiment of the present invention includes: a first member including at least two pipe portions extending in an identical direction and integrated, the first member including a recess between two adjacent pipe portions of the at least two pipe portions, the recess extending in a longitudinal direction of the at least two pipe portions from end surfaces of the at least two pipe portions, a part of the recess serving as a locking portion; and a second member including a locking wall formed with at least two hole portions into which the at least two pipe portions of the first member is insertable. The joined body is formed by joining the first member and the second member. The at least two pipe portions of the first member are inserted into the at least two hole portions of the second member, and the locking portion abuts on the locking wall of the second member, and an insertion portion inserted into the second member is joined to the second member in a state where the insertion portion is being pipe-expanded.

According to this configuration, as described above, the first member can be prevented from breaking through the second member, and the falling of the first member can be prevented, so that the reliability as a joined body can be improved.

According to the embodiments of the present invention, in the method for joining members of joining the first member and the second member, or the joined body thereof, when force is applied in the longitudinal direction of the first member, since the force can be dispersed to a portion (the locking portion) other than the joint portion, it is possible to prevent the first member from breaking through the second member due to the joining being broken.

MODES FOR CARRYING OUT THE INVENTION

Figure 1:
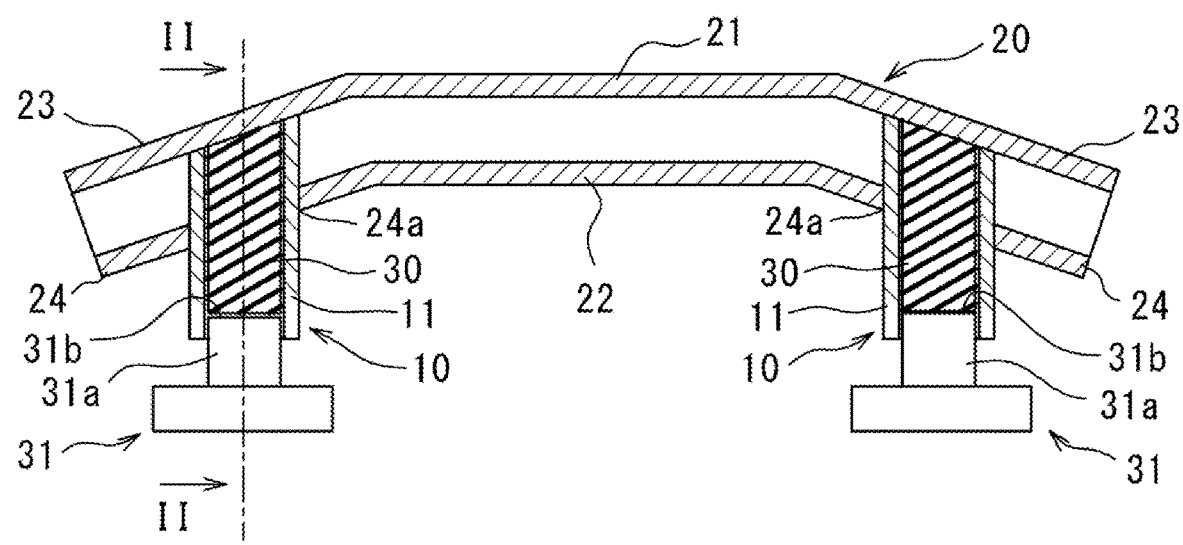
FIG. 1 is an upper cross-sectional view of a first step of a method for joining members according to a first embodiment of the present invention.

In the following, embodiments of the present invention will be described with reference to the accompanying drawings. The present embodiments relate to a method for joining members of joining a bumper stay (first member) 10 and a bumper beam (second member) 20 by using rubber (elastic body) 30. In each embodiment described below, the materials of the bumper stay 10 and the bumper beam 20 are not particularly limited, and the method for joining members according to each embodiment of the present invention can be applied to each optional material.

First Embodiment

The structure of each component used in the joining method of the present embodiment will be described with reference to FIGS. 1 to 3.

The bumper stay 10 is a member for connecting a bumper beam 20 described below and a vehicle framework (not shown). As illustrated in FIG. 1, one bumper beam 20 is connected to the vehicle framework with two bumper stays 10. In the bumper stay 10, one end (lower end in FIG. 1) connected to the vehicle framework has a flat surface perpendicular to the longitudinal direction of the pipe portion 11, but the other end (upper end in FIG. 1) connected to the bumper beam 20 is cut in accordance with the inclination of the bumper beam 20. As illustrated in FIG. 2, the bumper stay 10 is a double pipe formed by two pipe portions 11 of the same shape extending in the same direction being connected with the connection wall 12 on the side surface. The connection wall 12 extends from one end to the other end in the longitudinal direction of the bumper stay 10. However, the connection wall 12 does not extend to the end surfaces (left end in FIG. 2) of the two pipe portions 11 of the bumper stay 10, and extends to the portion other than the portion where the pipe portions 11 of the bumper stay 10 is inserted into the bumper beam 20 (insertion portion) in the joined state. The connection wall 12 and the end portions of the two pipe portions 11 form a recess 13 extending in the longitudinal direction of the pipe portion 11 from the end surface of the pipe portion 11 between the two pipe portions 11. In addition, a part of the connection wall 12 constituting the recess 13 is a locking portion 12a as described below. As illustrated in FIG. 3, in the cross section perpendicular to the longitudinal direction of the pipe portion 11, the shape of the bumper stay 10 is substantially rectangular. In addition, in the present embodiment, two connection walls 12 having the same shape are provided. In addition, in order to make the shape of the bumper stay 10 described here clearer, FIG. 4 illustrates a perspective view of a part of the bumper stay 10. As illustrated in FIG. 4, the recess 13 is flush with the aligned end surfaces of the two pipe portions 11 and has an opening 13a provided between the two pipe portions 11. The locking portion 12a is positioned one step descending from the opening 13a in the longitudinal direction of the pipe portion 11. This bumper stay 10 may be an extruded material made of an aluminum alloy, for example.

The bumper beam 20 is attached to the front of the vehicle and is for protecting the vehicle framework (not shown) from impact. As illustrated in FIG. 1, the bumper beam 20 includes: a front wall 21 on the front side when mounted on a horizontally extending vehicle; a rear wall 22 on the rear side disposed parallel to the front wall 21; two front inclined walls 23 extending obliquely from both end portions of the front wall 21; two rear inclined walls (locking walls) 24 disposed parallel to the front inclined walls 23 and extending from both end portions of the rear wall 22; and an upper wall 25 and a lower wall 26, being horizontal, connecting these at the top and bottom. That is, the bumper beam 20 of the present embodiment has a pipe shape whose both end portions are inclined. Each of the two rear inclined walls 24 has two hole portions 24a into which each of the two pipe portions 11 of the bumper stay 10 is inserted (see FIG. 3). The hole portion 24a has a rectangular shape substantially similar to the outer shape of the pipe portion 11 of the bumper stay 10, and is formed slightly larger than the outer shape of the bumper stay 10. In addition, the bumper beam 20 includes a partition wall 27 for partitioning the internal space (see FIG. 2). The partition wall 27 is disposed parallel to the upper wall 25 and the lower wall 26. The partition wall 27 connects the front wall 21 and the rear wall 22, and connects the front inclined wall 23 and the rear inclined wall 24. This bumper beam 20 may be made of an extruded material made of an aluminum alloy, for example.

Figure 3:
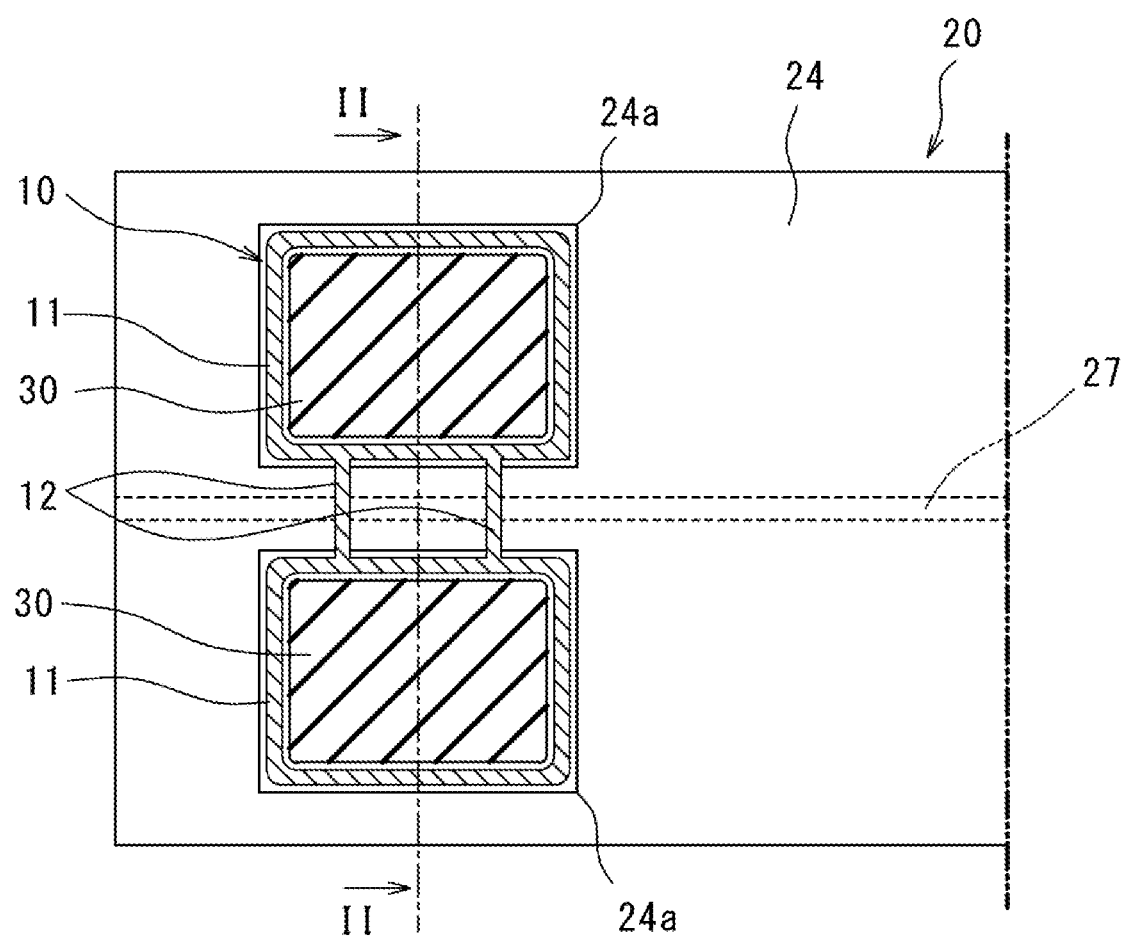
FIG. 3 is a rear cross-sectional view taken along the line III-III in FIG. 2.
Figure 4:
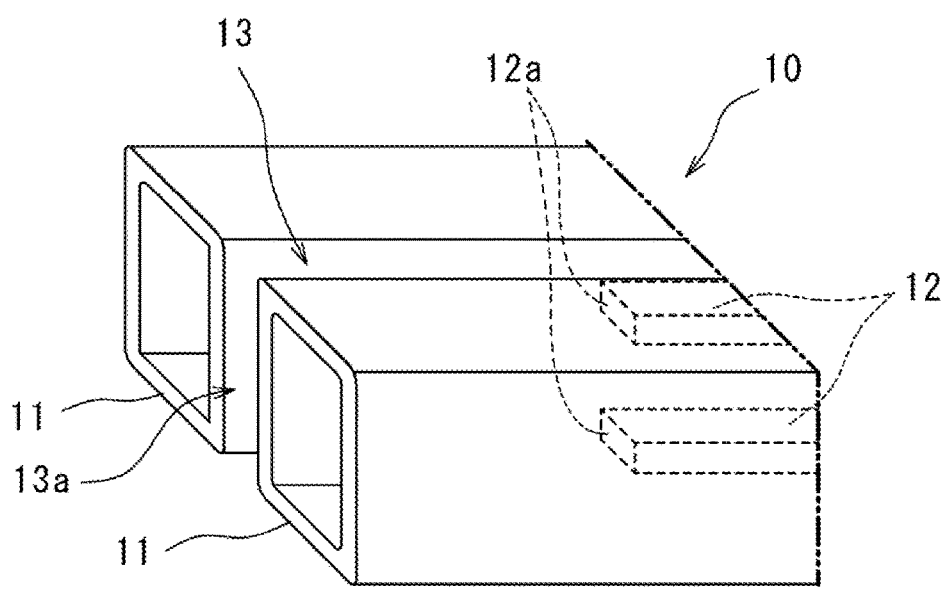
FIG. 4 is a perspective view illustrating a part of a bumper stay to be joined by a method for joining members according to the first embodiment.

The rubber 30 has a square pole shape extending in the longitudinal direction of the pipe portion 11 (see FIG. 3). The outer shape of the rubber 30 is formed slightly smaller than the inner shape of the bumper stay 10 to the extent that the rubber 30 can be inserted into the bumper stay 10. One end of the rubber 30 has a flat surface perpendicular to the longitudinal direction of the rubber 30, but the other end has a flat surface inclined to the longitudinal direction of the rubber 30 according to the shape of the bumper beam 20 (see FIG. 1). This is similar to the bumper stay 10 described above. As a quality of material of the rubber 30, for example, it is preferable to use any one of urethane rubber, chloroprene rubber, CNR rubber (chloroprene rubber+nitrile rubber), or silicone rubber. In addition, the hardness of the rubber 30 is preferably 30 or more in Shore A.

As illustrated in FIG. 1, the plunger 31 is attached to a press device or the like (not shown), and driving the plunger 31 with the press device allows the rubber 30 to be compressed in the longitudinal direction of the pipe portion 11. The plunger 31 has a protrusion 31*a*. The protrusion 31*a* is a portion for pressing the rubber 30. The pressing surface 31*b* being an end surface of the protrusion 31*a* has a flat surface perpendicular to the protruding direction.

Joining the bumper stay 10 and the bumper beam 20 by press-fitting is performed in the following procedure.

First, as illustrated in FIG. 1, the bumper stay 10, the bumper beam 20, and the rubber 30 having the structure as described above are provided. Then, as illustrated in FIG. 2, the bumper stay 10 is inserted into the hole portion 24*a* of the bumper beam 20 until the connection wall 12 abuts on the rear inclined wall 24. At this time, since the connection wall 12 is disposed in the direction orthogonal to the rear inclined wall 24, the connection wall 12 does not abut on the rear inclined wall 24 at a point, but abuts on the rear inclined wall 24 at a side. In addition, at this time, the pipe portion 11 of the bumper stay 10 is inserted into the hole portion 24*a* of the bumper beam 20 so that the partition wall 27 is disposed in the recess 13. Then, the rubber 30 is inserted into the bumper stay 10.

Figure 5:
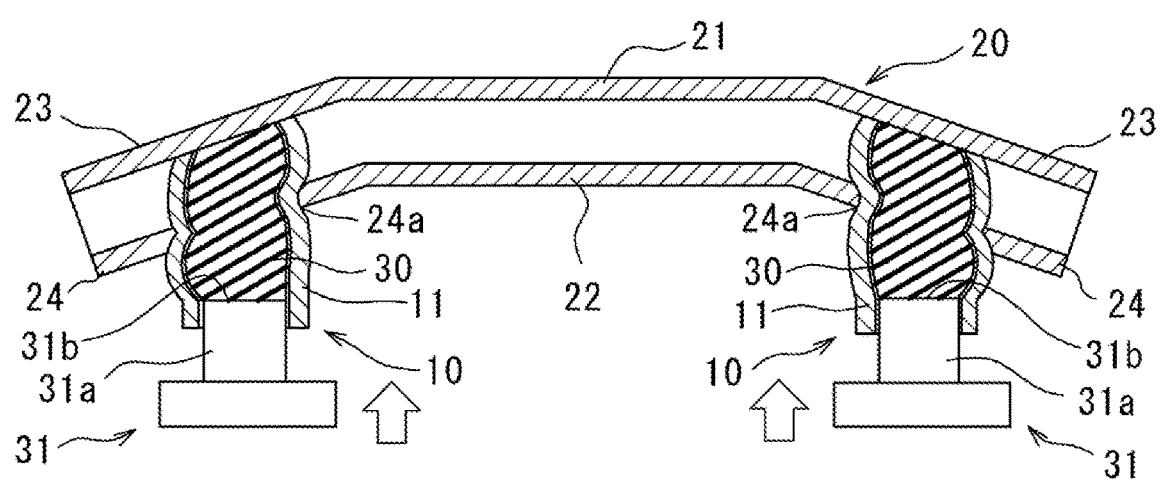
FIG. 5 is an upper cross-sectional view of a second step of a method for joining members according to the first embodiment of the present invention.

After the rubber 30 is inserted, as illustrated in FIG. 5, the protrusion 31*a* of the plunger 31 is inserted into the bumper stay 10, and the rubber 30 is compressed in the longitudinal direction of the pipe portion 11 of the bumper stay 10 and expanded in the direction orthogonal to the compression direction, whereby the bumper stay 10 is pipe-expanded. The bumper stay 10 is joined to the bumper beam 20 by press-fitting due to the pipe expansion.

Figure 6:
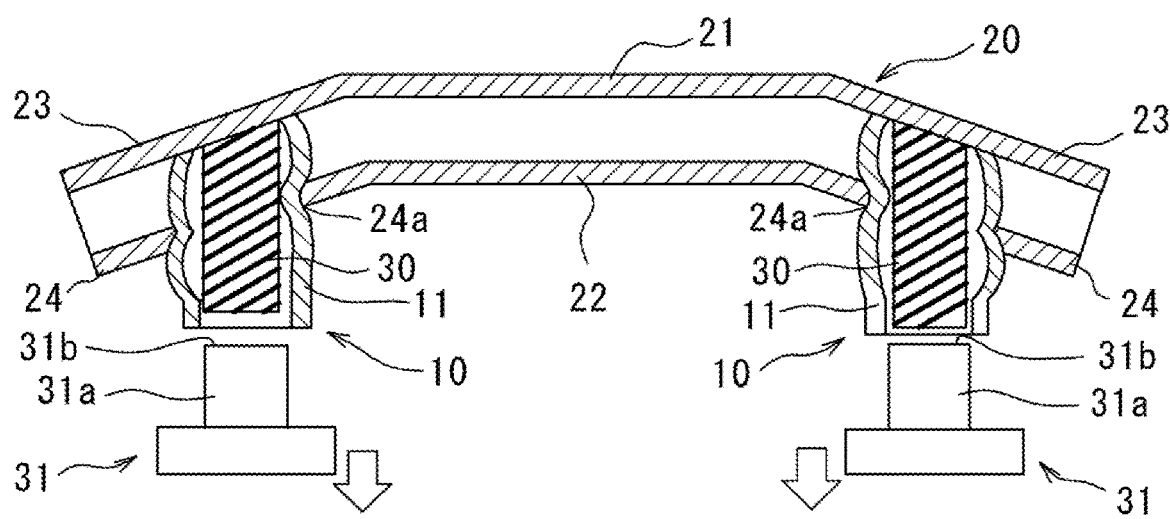
FIG. 6 is an upper cross-sectional view of a third step of a method for joining members according to the first embodiment of the present invention.

After the joining by press-fitting, as illustrated in FIG. 6, the compression by the plunger 31 is released. The rubber 30 from which the compression force is removed is restored to its original shape by its own elastic force. Therefore, the rubber 30 can be easily removed from the bumper stay 10.

The effect by a method for joining members of the present embodiment will be described.

Figure 2:
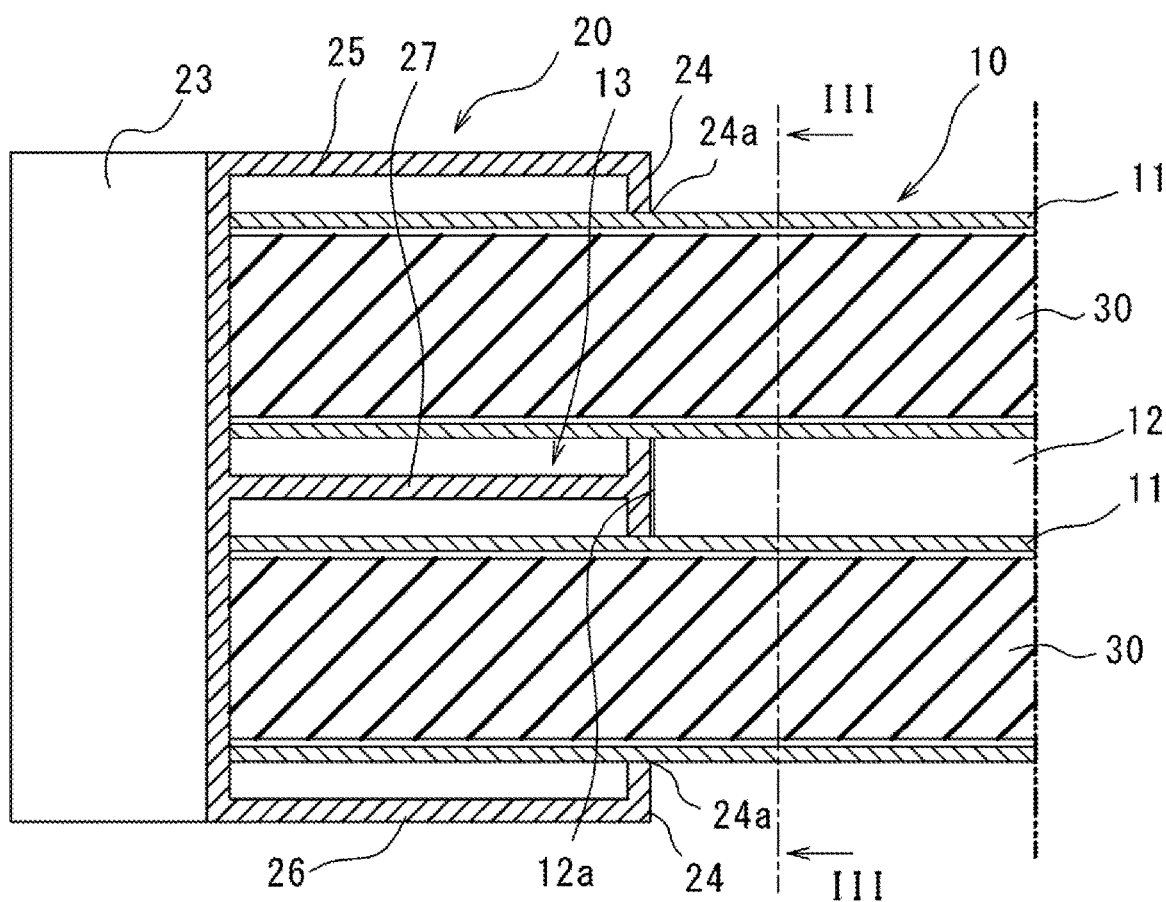
FIG. 2 is a side cross-sectional view taken along the line II-II in FIG. 1.

According to the present embodiment, the recess 13 is provided at the end portion of the pipe portion 11 in the bumper stay 10, and a part of the recess 13 is the locking portion 12*a* (see FIGS. 2 and 4). That is, the locking portion 12*a* is not flush with the end surface of the pipe portion 11 of the bumper stay 10, but is provided at a position one step descending from the end surface of the pipe portion 11 of the bumper stay 10. Therefore, when the pipe portion 11 of the bumper stay 10 is inserted into the hole portion 24*a* of the bumper beam 20, any of the locking portions 12*a* is not inserted, and can abut on the rear inclined wall 24 outside the bumper beam 20. Therefore, when force is applied in the longitudinal direction (front-rear direction of the vehicle) of the bumper stay 10, the force can be received not only at the joint portion but also at the abutting portion. As described above, since the force can also be dispersed to parts other than the joint portion, it is possible to prevent the joining from being broken and to prevent the bumper stay 10 from breaking through the bumper beam 20. In addition, even when force is applied, for example, in the longitudinal direction of the bumper beam 20 (the width direction of the vehicle) other than the longitudinal direction of the bumper stay 10, since the bumper stay 10 is supported by the bumper beam 20 at this abutting portion, it is possible to prevent the bumper stay 10 from falling sideways due to the joining being broken.

In addition, according to the present embodiment, the pipe portion 11 of the bumper stay 10 can be uniformly expanded due to the isotropic deformability of the rubber 30. Therefore, the local load on the bumper stay 10 can be reduced, and local deformation of the bumper stay 10 can be prevented. Therefore, the bumper stay 10 and the bumper beam 20 can be fitted with high accuracy, that is, the joining strength can be improved, as compared with other joining methods.

In addition, according to the present embodiment, the rigidity of the bumper beam 20 is improved by the partition wall 27. In addition, when the bumper stay 10 is expanded inside the bumper beam 20, the pipe portion 11 of the bumper stay 10 also abuts on the partition wall 27. Therefore, since the area of the joint portion is increased, the joining strength can be improved, and since the bumper stay 10 can be supported by the partition wall 27, the fall of the bumper stay 10 can be further prevented as described above. In addition, if machining for providing the hole portion 24*a* to the partition wall 27 is needed, such complicated machining is generally difficult. However, in the above method, since the pipe portion 11 of the bumper stay 10 is inserted into the hole portion 24*a* of the bumper beam 20 so that the partition wall 27 is disposed in the recess 13, that is, the partition wall 27 engages in the recess 13, the pipe portion 11 of the bumper stay 10 can be inserted into the hole portion 24*a* of the bumper beam 20 while avoiding the partition wall 27. Therefore, the partition wall 27 does not need to be subjected to complicated machining for providing the hole portions 24*a*, and the above method is effective from the viewpoint of machining property. It should be noted that although the partition wall 27 of the bumper beam 20 is preferably provided, the partition wall 27 is not essential to the present invention.

In addition, according to the present embodiment, since the locking portion 12*a* being a part of the two connection walls 12 abuts on the rear inclined wall 24 in the joined state, the bumper stay 10 is supported by the bumper beam 20 at two places other than the joint portion. Therefore, it is possible to effectively prevent the breaking through the bumper beam 20 and falling of the bumper stay 10 described above, as compared with the case of supporting at one place other than the joint portion.

In addition, according to the present embodiment, when collision force from the front is applied to the vehicle, since the bumper stay 10 can be prevented from breaking through the bumper beam 20 as described above, the bumper stay 10 is crushed in the event of a collision. When the bumper stay 10 is crushed, the energy of the collision is absorbed, so that the collision force can be dispersed before reaching the cabin, and the driver can be protected safely. In addition, when the collision force is applied from the side of the vehicle, the bumper stay 10 can be prevented from falling down (falling sideways) as described above, so that the bumper stay 10 can be prevented from coming out of the bumper beam 20. Therefore, the reliability of the bumper can be improved. In addition, although, as the application object of the present invention, the bumper (joined body) is illustrated as described above, the present invention is applicable to a joined body accompanied by pipe-expanded joining besides a bumper.

Figure 7:
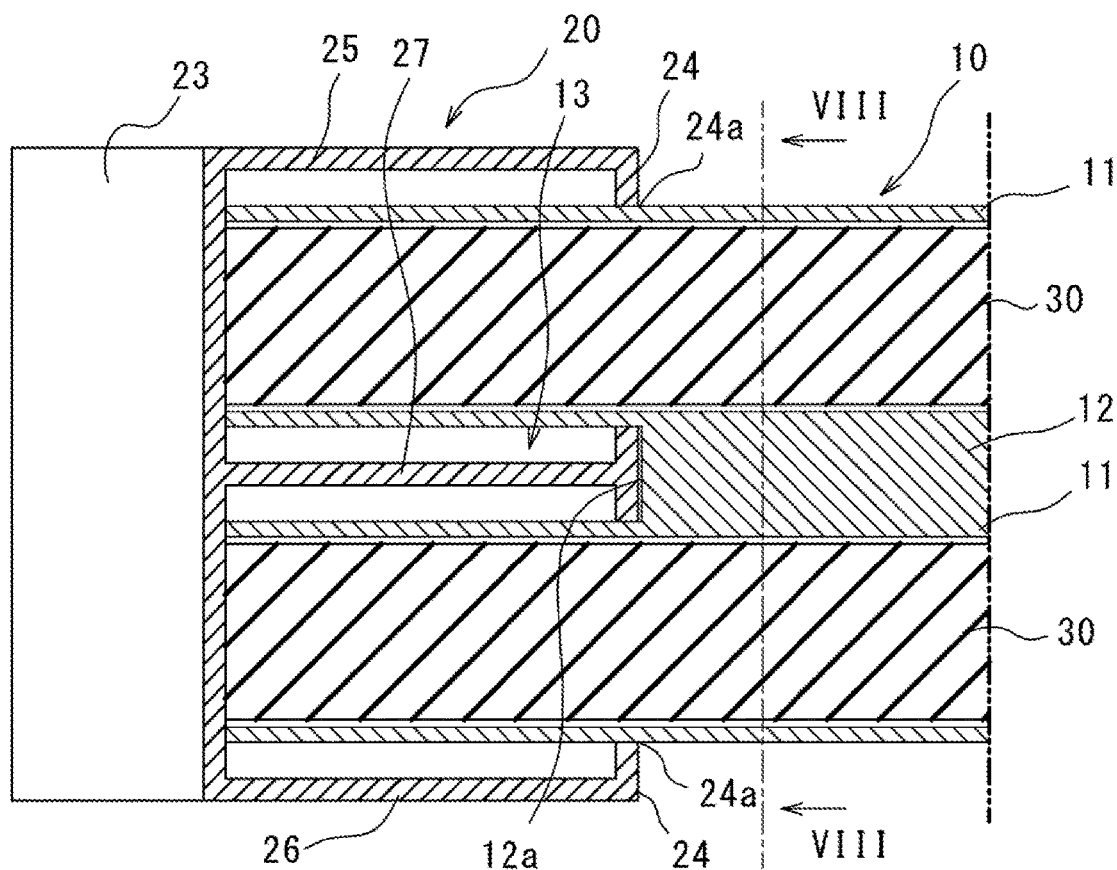
FIG. 7 is a side cross-sectional view of a first modified example of a method for joining members according to the first embodiment.
Figure 8:
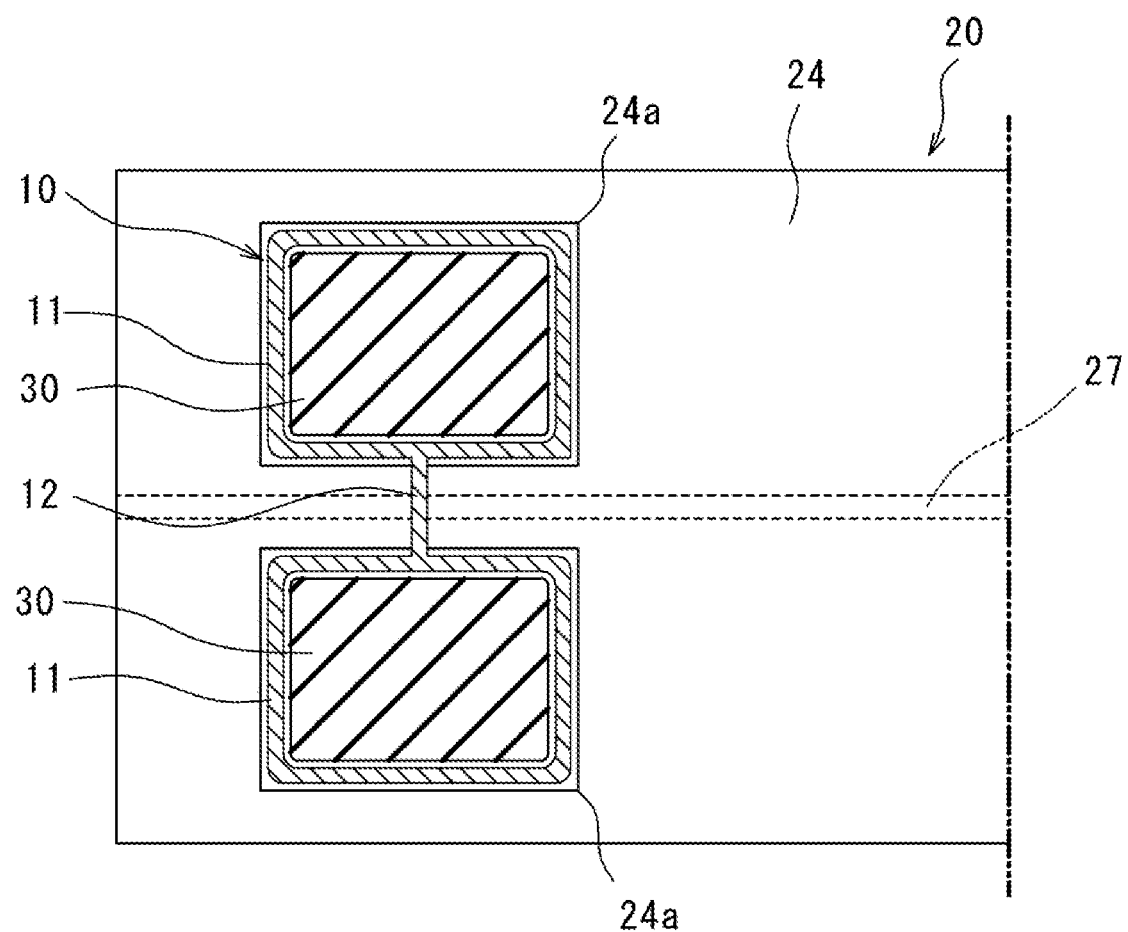
FIG. 8 is a rear cross-sectional view taken along the line VIII-VIII in FIG. 7.
Figure 9:
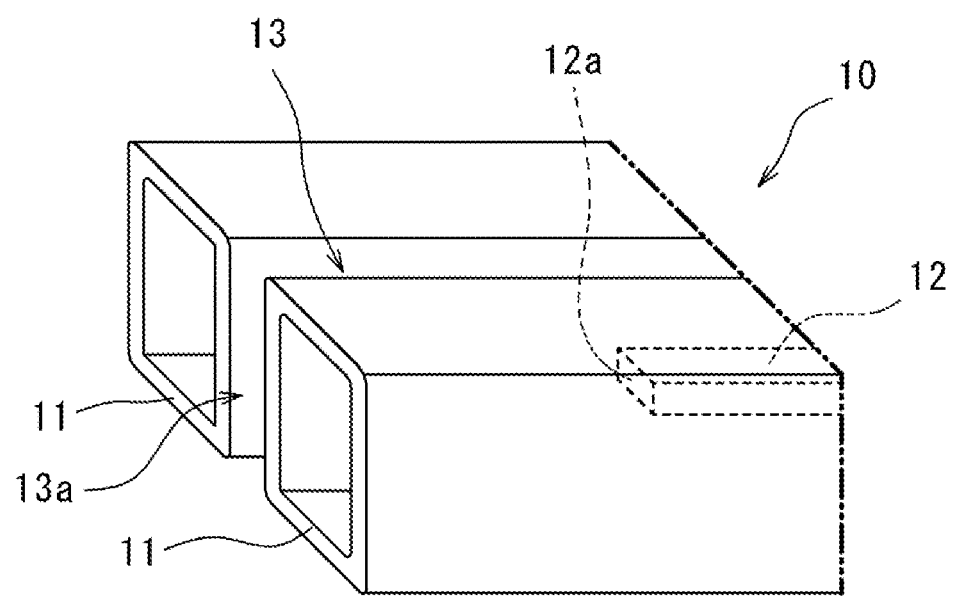
FIG. 9 is a perspective view illustrating a part of a bumper stay to be joined by a method for joining members of the first modified example.

FIGS. 7 to 9 illustrate a first modified example of the present embodiment. As in the present modified example, the number of connection walls 12 of the bumper stay 10 may be one.

According to the present modified example, since there is only one connection wall 12, the connection wall 12 can be easily formed, and the breaking through the bumper beam 20 and falling of the bumper stay 10 can be easily prevented.

Figure 10:
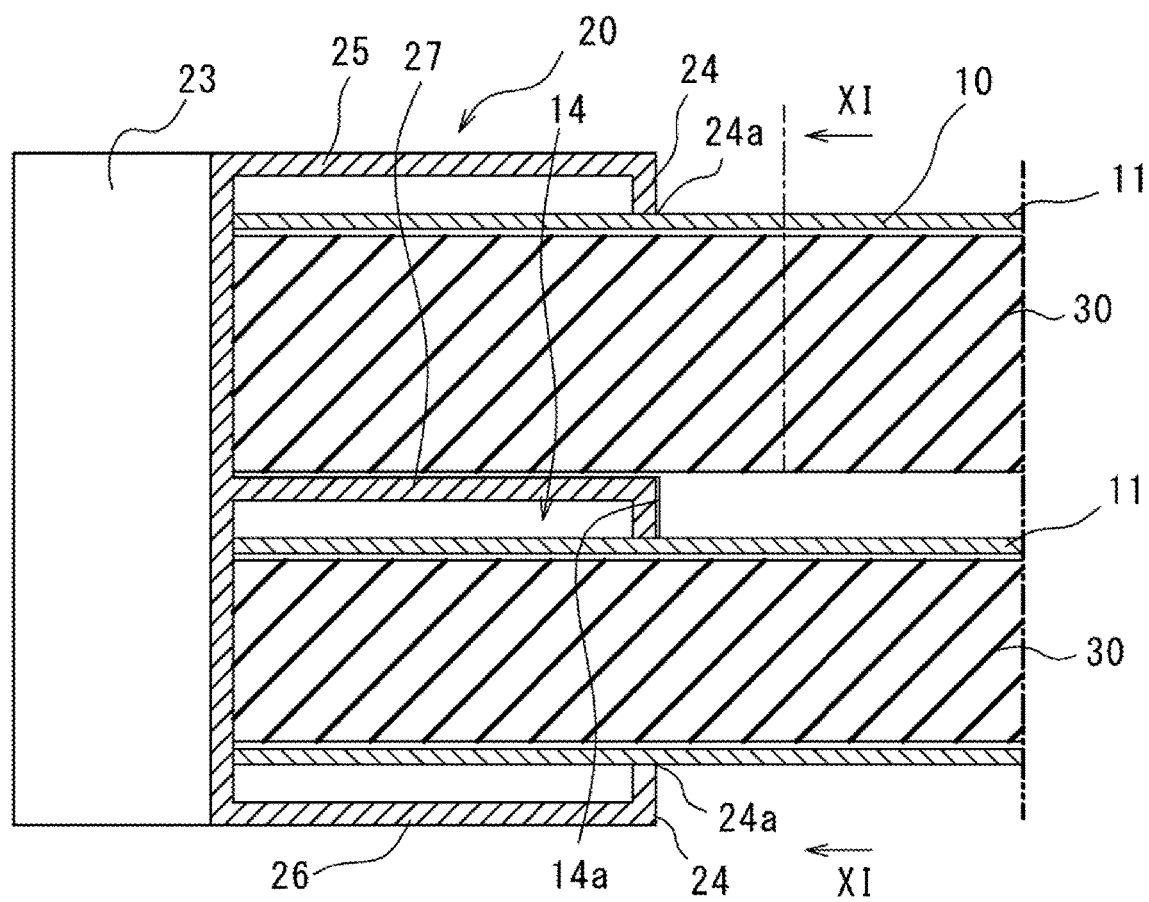
FIG. 10 is a side cross-sectional view of a second modified example of a method for joining members according to the first embodiment.
Figure 11:
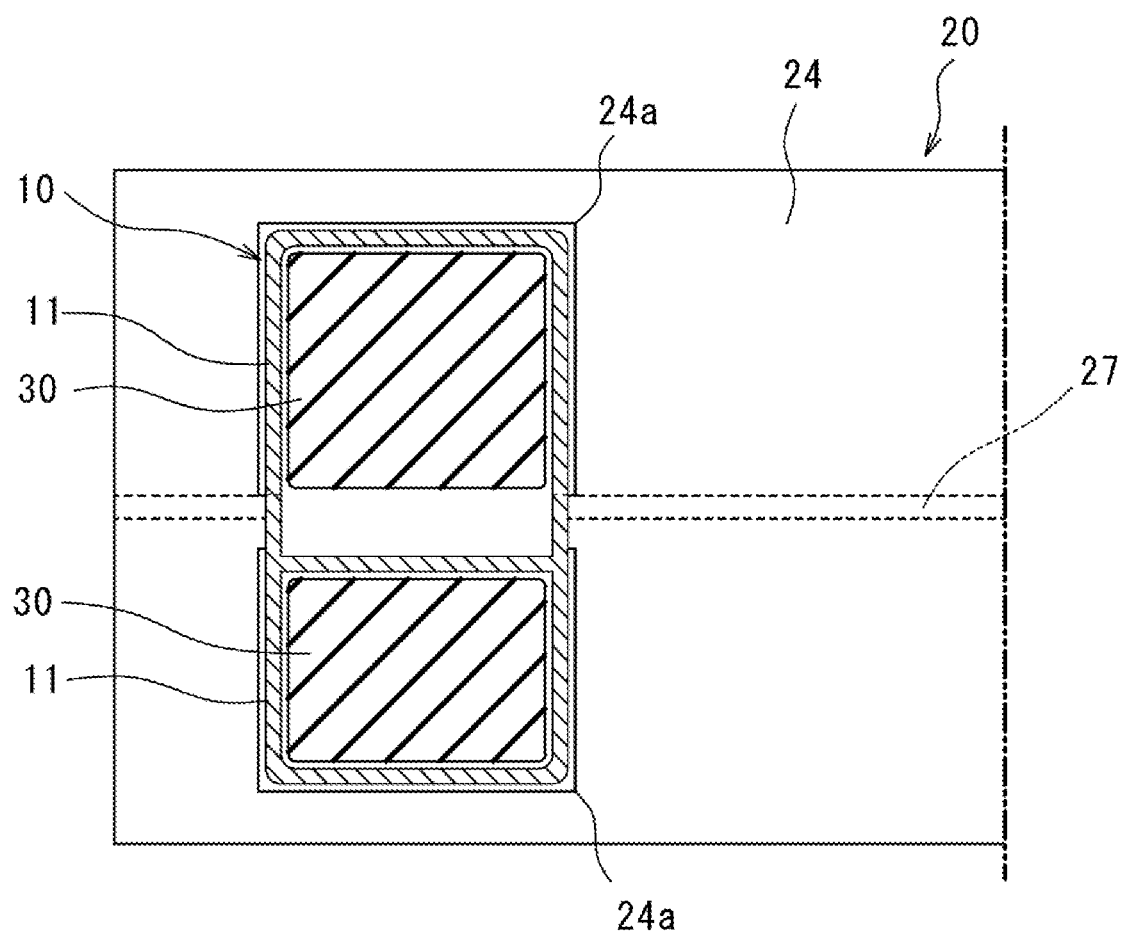
FIG. 11 is a rear cross-sectional view taken along the line XI-XI in FIG. 10.
Figure 12:
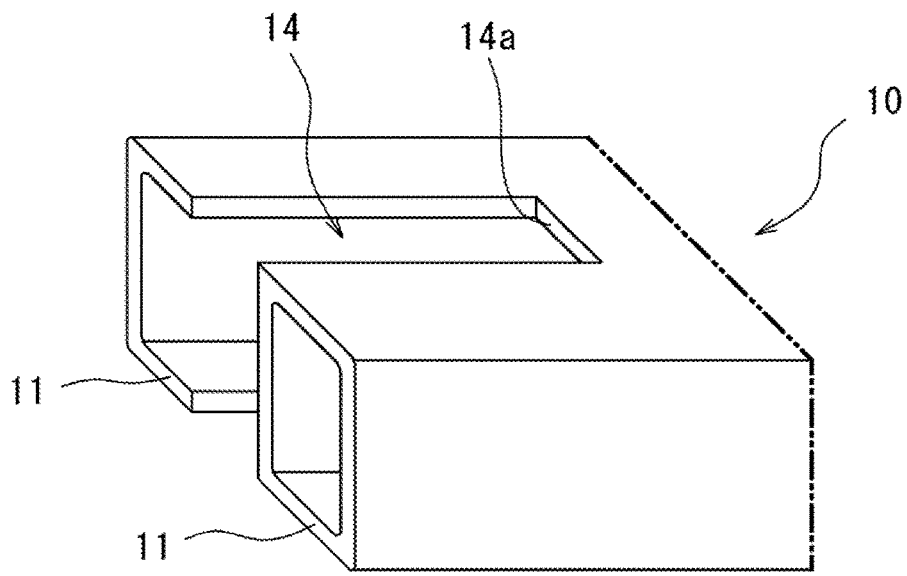
FIG. 12 is a perspective view illustrating a part of a bumper stay to be joined by a method for joining members of the second modified example.

FIGS. 10 to 12 illustrate a second modified example of the present embodiment. In the present modified example, the bumper stay 10 is not provided with a connection wall 12 (see FIGS. 4 and 10), and one of the two pipe portions 11 of the bumper stay 10 is cut out to form a cutout portion (recess) 14. In the present modified example, one of the two pipe portions 11 constituting the bumper stay 10 is relatively larger than the other one, and the cutout portion 14 of the present modified example is formed by cutting out in a rectangular shape the side end portion of the relatively larger pipe portion 11. In addition, a part of the cutout portion 14 is a locking portion 14a being a portion for abutting on the rear inclined wall 24 of the bumper beam 20.

According to the present modified example, when the cutout portion 14 is formed, the cutout portion 14 can be easily formed by cutting work or the like without the need to provide the connection wall 12 as described above. In addition, the cutout portion 14 can be formed later by using, for example, an existing double pipe as the bumper stay 10.

In addition, the hole portion 24a of the bumper beam 20 may be burring-machined. Since the joining area between the bumper stay 10 and the bumper beam 20 can be increased by burring, the joining strength can be improved.

Second Embodiment

Figure 13:
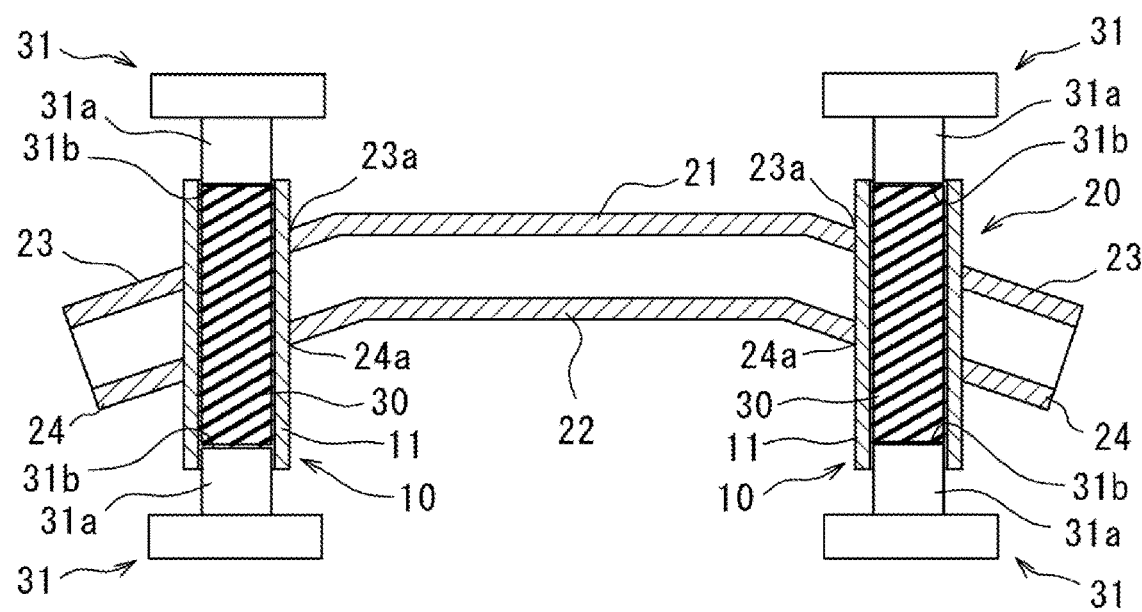
FIG. 13 is an upper cross-sectional view of a first step of a method for joining members according to a second embodiment of the present invention.
Figure 14:
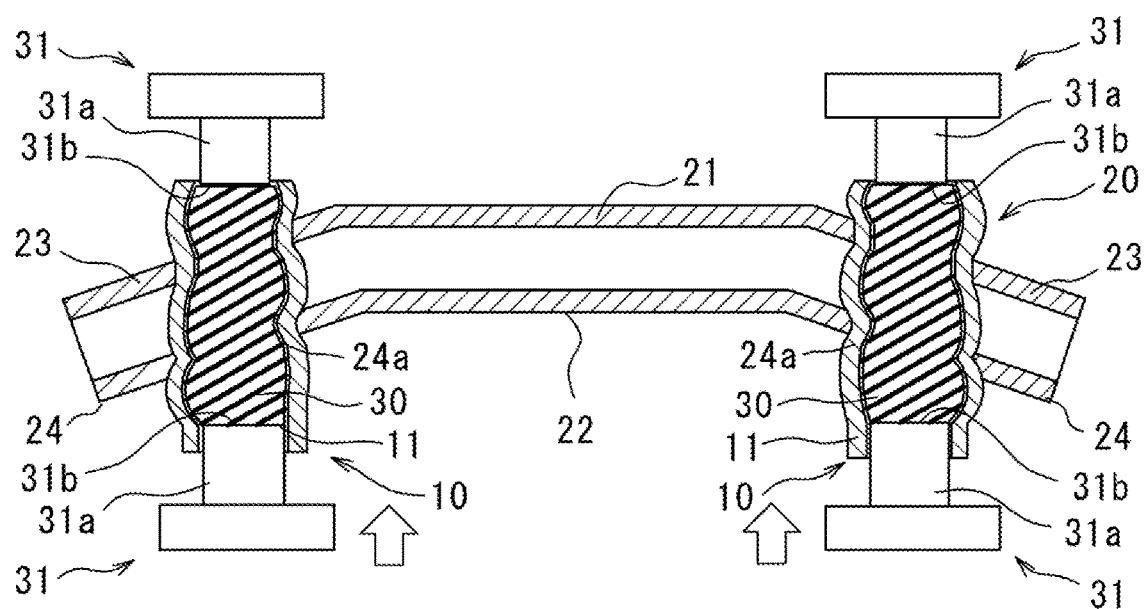
FIG. 14 is an upper cross-sectional view of a second step of a method for joining members according to the second embodiment of the present invention.
Figure 15:
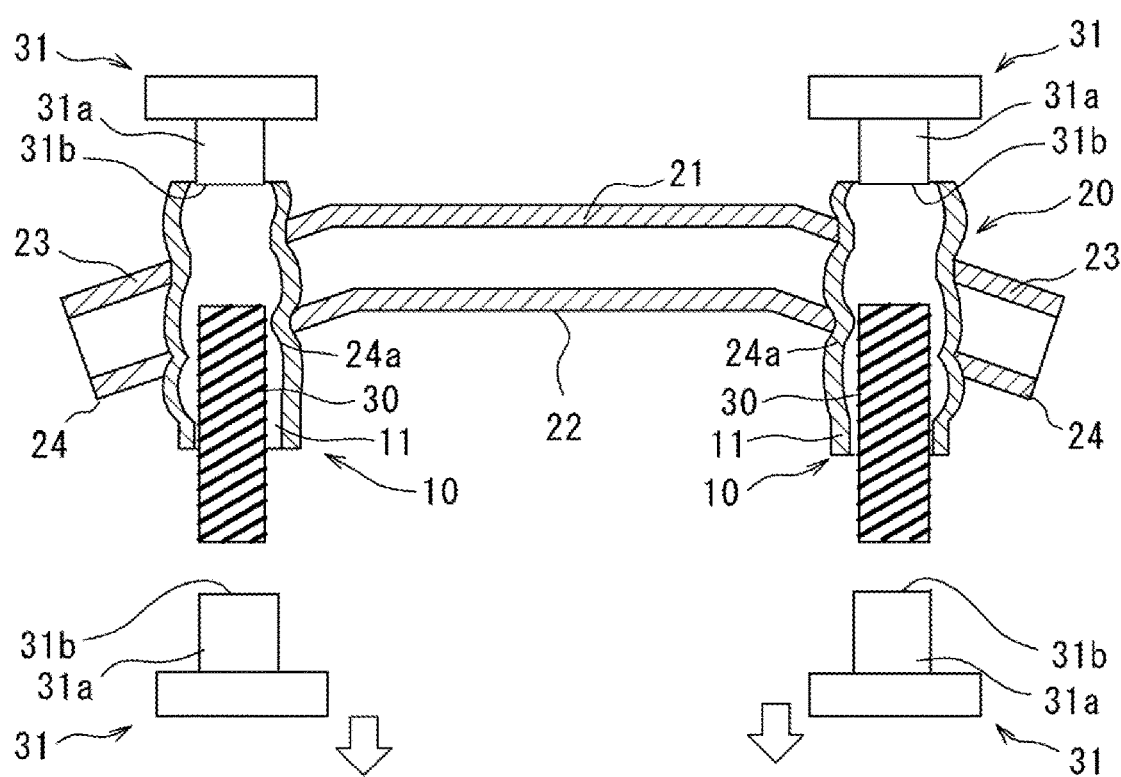
FIG. 15 is an upper cross-sectional view of a third step of a method for joining members according to the second embodiment of the present invention.

In the method for joining members of the second embodiment illustrated in FIGS. 13 to 15, the bumper stay 10 completely penetrates the bumper beam 20. Except for the matter relating to this, it is the same as the method for joining members of the first embodiment in FIGS. 1 to 6. Therefore, the same reference numerals are given to the same parts as those illustrated in FIGS. 1 to 6, and description thereof will be omitted.

As illustrated in FIG. 13, in the present embodiment, the bumper stay 10 penetrates the bumper beam 20. The shapes of both ends of the bumper stay 10 and the rubber 30 respectively have flat surfaces perpendicular to the longitudinal direction of the pipe portion 11 and the rubber 30. The front inclined wall 23 of the bumper beam 20 is provided with a hole portion 23a concentrically of the same shape as the hole portion of the rear inclined wall 24. The plungers 31 are arranged at both end portions of one bumper stay 10, that is, two plungers are arranged, and the plungers 31 are inserted from both end portions of the bumper stay 10.

As illustrated in FIG. 14, at the time of joining by press-fitting, in the present embodiment, one plunger 31 is fixed and disposed, and the other plunger 31 is inserted from the end portion of the bumper stay 10. Then, the rubber 30 is compressed in the longitudinal direction of the pipe portion 11 of the bumper stay 10 by the plungers 31 and expanded in the direction orthogonal to the compression direction, whereby the pipe portion 11 of the bumper stay 10 is expanded. The pipe portion 11 of the bumper stay 10 is joined to the two hole portions 23a and 24a of the bumper beam 20 by press-fitting due to pipe expansion. That is, in the present embodiment, one bumper stay 10 is joined to the bumper beam 20 in at least two places (two hole portions 23a and 24a) by press-fitting.

As illustrated in FIG. 15, after joining by press-fitting, the compression by the plungers 31 is released, and the rubber 30 from which the compression force is removed is restored to its original shape by its own elastic force. Therefore, the rubber 30 can be easily removed from the bumper stay 10.

According to the present embodiment, when the hole portions 23a and 24a are formed in the bumper beam 20, through holes can be formed. The through hole is easy to form from the viewpoint of machining as compared with a half stop (half through) hole. In addition, since the bumper stay 10 penetrates the bumper beam 20, the rubber 30 can be inserted from any of the end portions of the pipe of the bumper stay 10, so that the convenience is improved as compared with that of the first embodiment. In addition, the joining strength is improved as compared with that of the first embodiment due to joining at two places by press-fitting.

As described above, although the specific embodiments and their modified examples of the present invention are described, the present invention is not limited to the above-described embodiments, and can be implemented with various modifications within the scope of the present invention. For example, an appropriate combination of contents of the individual embodiments may be one embodiment of the present invention. In addition, the bumper stay 10 may be formed by connecting three or more pipe portions 11. In addition, pipe expansion machining does not have to be performed on all the pipe portions 11, and only a part of the pipe portions 11 may be expanded to be joined by press-fitting. In addition, the pipe expansion machining is also not limited to machining using the rubber 30, and may be electromagnetic molding, machining, or the like.

The invention claimed is:

1. A method for joining members, the method comprising:
providing
a first member including at least two pipe portions extending in an identical direction and integrated, the first member including a recess provided between two adjacent pipe portions of the at least two pipe portions, the recess extending in a longitudinal direction of the at least two pipe portions from end surfaces of the at least two pipe portions, a part of the recess serving as a locking portion, and
a second member including a locking wall formed with at least two hole portions into which the at least two pipe portions of the first member are insertable respectively;
inserting the at least two pipe portions of the first member into the at least two hole portions of the second member until the locking portion abuts on the locking wall; and
pipe-expanding an insertion portion of the at least two pipe portions of the first member inserted into the second member to join the insertion portion to the second member by press-fitting.

2. The method for joining members according to claim 1, wherein the first member penetrates the second member.

3. The method for joining members according to claim 1, further comprising:
providing an elastic body insertable into the at least two pipe portions of the first member;
inserting the elastic body into the at least two pipe portions of the first member; and
compressing the elastic body in a longitudinal direction of the at least two pipe portions of the first member to expand the elastic body radially outward of the at least two pipe portions, thereby pipe-expanding the first member.

4. The method for joining members according to claim 1, wherein
the second member is pipe-shaped and has a partition wall partitioning an inside of the second member, and
the at least two pipe portions of the first member are inserted into the at least two hole portions of the second member so that the partition wall is disposed in the recess.

5. The method for joining members according to claim 1, wherein
the recess is formed by:
end portions of the two adjacent pipe portions of the first member; and
two connection walls connecting the two adjacent pipe portions of the first member, the two connection walls orthogonal to the locking wall, and
the locking portion is a part of the connection wall.

6. The method for joining members according to claim 1, wherein
the recess is formed by:
end portions of the two adjacent pipe portions of the first member; and
one connection wall connecting the two adjacent pipe portions of the first member, the one connection wall orthogonal to the locking wall, and
the locking portion is a part of the connection wall.

7. The method for joining members according to claim 1, wherein
the recess is formed by a cutout portion obtained by cutting out an end portion of one of the at least two pipe portions of the first member, and
the locking portion is a part of the cutout portion.

8. The method for joining members according to claim 1, wherein the first member is a bumper stay of a vehicle, and the second member is a bumper beam of a vehicle.

9. The method for joining members according to claim 1, wherein the hole portion of the second member is burring-machined.

10. A joined body comprising:
a first member including at least two pipe portions extending in an identical direction and integrated, the first member including a recess between two adjacent pipe portions of the at least two pipe portions, the recess extending in a longitudinal direction of the at least two pipe portions from end surfaces of the at least two pipe portions, a part of the recess serving as a locking portion; and
a second member including a locking wall formed with at least two hole portions into which the at least two pipe portions of the first member is insertable,
the joined body being formed by joining the first member and the second member, wherein
the at least two pipe portions of the first member are inserted into the at least two hole portions of the second member, and the locking portion abuts on the locking wall of the second member, and
an insertion portion inserted into the second member is joined to the second member in a state where the insertion portion is pipe-expanded.

11. The method for joining members according to claim 2, further comprising:
providing an elastic body insertable into the at least two pipe portions of the first member;
inserting the elastic body into the at least two pipe portions of the first member; and
compressing the elastic body in a longitudinal direction of the at least two pipe portions of the first member to expand the elastic body radially outward of the at least two pipe portions, thereby pipe-expanding the first member.

12. The method for joining members according to claim 2, wherein
the second member is pipe-shaped and has a partition wall partitioning an inside of the second member, and
the at least two pipe portions of the first member are inserted into the at least two hole portions of the second member so that the partition wall is disposed in the recess.

13. The method for joining members according to claim 2, wherein
the recess is formed by:
end portions of the two adjacent pipe portions of the first member; and
two connection walls connecting the two adjacent pipe portions of the first member, the two connection walls orthogonal to the locking wall, and
the locking portion is a part of the connection wall.

14. The method for joining members according to claim 2, wherein
the recess is formed by:
end portions of the two adjacent pipe portions of the first member; and
one connection wall connecting the two adjacent pipe portions of the first member, the one connection wall orthogonal to the locking wall, and
the locking portion is a part of the connection wall.

15. The method for joining members according to claim 2, wherein
the recess is formed by a cutout portion obtained by cutting out an end portion of one of the at least two pipe portions of the first member, and
the locking portion is a part of the cutout portion.

16. The method for joining members according to claim 2, wherein the hole portion of the second member is burring-machined.

* * * * *